Figure 1:
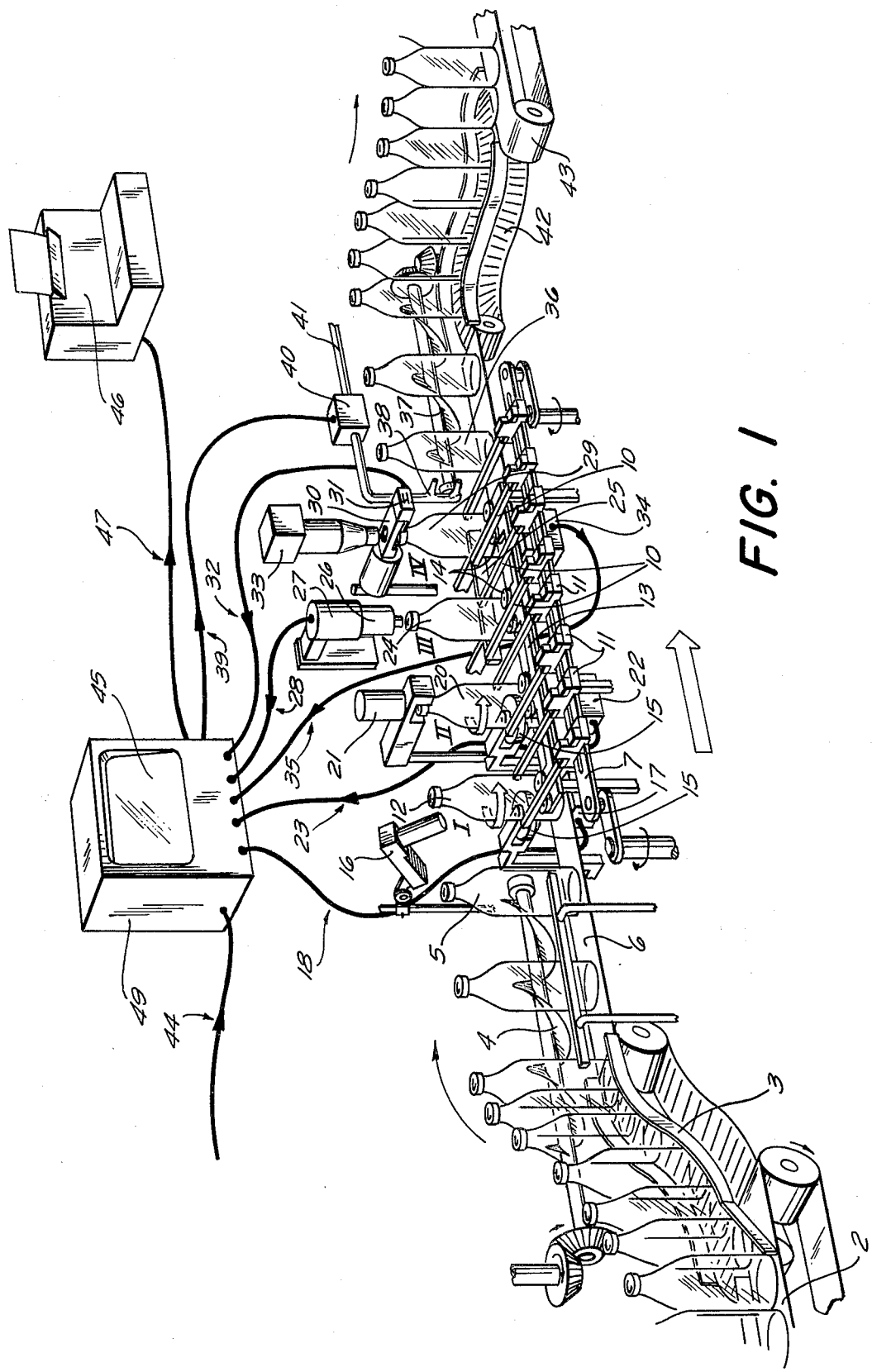

United States Patent [19]
Fornåå

[11] 3,923,158
[45] Dec. 2, 1975

[54] ON-LINE MULTISTATION INSPECTION DEVICE FOR MACHINE MOULDED PRODUCTS

[75] Inventor: Göran Fornåå, Kungalv, Sweden

[73] Assignee: Aktiebolaget Platmanufaktur, Malmo, Sweden

[22] Filed: June 5, 1974

[21] Appl. No.: 476,602

[30] Foreign Application Priority Data
June 21, 1973 Sweden .............................. 7308766

[52] U.S. Cl. ......... 209/75; 209/111.7; 235/61.11 E; 250/223 B
[51] Int. Cl.² ................................................ B07C 5/342
[58] Field of Search ............... 209/75, 111.7, 111.6; 250/223 B; 235/61.11 E, 61.12 N, 151.3, 92 PK, 92 MT, 92 DN; 356/240; 65/29, 158

[56] References Cited
UNITED STATES PATENTS

| | | |
|---|---|---|
| 3,098,564 | 7/1963 | Fouse et al. .......................... 209/75 |
| 3,313,409 | 4/1967 | Johnson ........................... 209/75 X |
| 3,587,856 | 6/1971 | Lemelson ........................ 209/111.7 |
| 3,645,391 | 2/1972 | Hirakawa .................... 209/111.7 X |
| 3,745,314 | 7/1973 | Mathias et al. .................. 250/223 B |
| 3,757,940 | 9/1973 | Damm ................................ 209/75 |

Primary Examiner—Allen N. Knowles
Attorney, Agent, or Firm—Hane, Baxley & Spiecens

[57] ABSTRACT

A bottle making machine is provided with a plurality of inspection stations which inspect bottles on line to provide information for rejecting faulily made bottles.

6 Claims, 3 Drawing Figures

ON-LINE MULTISTATION INSPECTION DEVICE FOR MACHINE MOULDED PRODUCTS

The present invention relates to a device for the inspection of machine moulded products.

Within the packaging industry, which is manufacturing package units of e.g. plastic or glass material, there is present a demand to efficiently inspect manufactured products. The number of faults, which industry thus wishes to detect, amount to a fairly high number, (in the case of glass products it may be all the way up to 40 different faults.) One is therefore restricted to concentrate the machine inspection to the most commonly present types of faults, which in the case glass products e.g. may consist of cracks or so called "checks" in various places, variations in height, outer- or inner-diameters and the like. Supplementary to a machine inspection one may also use visual inspection, which is directed to those faults, that the inspection apparatus does not detect. Combined with above such inspection one may also resort to some kind of random sample inspection methods.

Due to desired high speed in the manufacture of packages a certain number of moulds must often be made to work into the same line of manufacture and thus with the same inspecting device. This fact necessitates the identification of the particular mould when a faulty product appears, such that the fault may be rapidly corrected. Every inspection installation should therefore besides having handling- and inspecting means also be equipped with an identification device located e.g. at the last inspection station of the installation for providing information of the origin of the package to enable a rapid correction of the mould in question.

In the known art of manufacturing glass containers a machine is used, which is made up of individual sections (usually six). In each section one or more containers may then be moulded simultaneously in every cycle of operation, whereby the moulding takes place in cast iron moulds.

Each and every such mould has its own particular number, which is pressed into the glass for enabling a later identification of the particular mould from which a container originates after the discovery of a faulty product. Today the major part of all package inspection takes place visually, but during recent years an increasing number of inspecting machines have been marketed. Together they cover a fairly large number of different types of faults such as cracks, wall thickness, unevenesses, roundness and height deviations. These machines thus usually include a rejector means, which discards the container in question upon the detection of a fault.

The manufacturer demands in this process that the inspection apparatus shall be able to work rapidly (at least 2 to 300 units per minute) in synchronization with the line of manufacture and that container units in the process are handled swiftly yet accurately and carefully when advanced between successive stations. For economic reasons it is further desirable to obtain the possibility of combining the detection of different types of faults with the mould number reading in one and the same machine, which also should be so flexible as to allow a quick and easy exchange of detector units, which may be interchangeable with other manufacturing lines. For the same reason all the required detector stations should if possible be served by one and the same type of advancing and handling devices.

The disadvantage with the present state of the art is that available inspecting machines lack desired flexibility in that they are locked to one production line only and that they do not automaticly read the mould number. Therefore, when a different combination of faults are to be detected, the exchange of a certain detecting device is a tedious matter and as a consequence expensive, particularly if the line has to be stopped or the inspection discontinued and faulty products allowed to pass.

Furthermore the present state of the art requires a comparatively large stock of different types of detecting units, which are not easily and effectively interchangeable between different manufacturing lines. A further disadvantage with the present state of the art is that the different detector units are not particularly suitable for co-operation with other inspecting units, visual inspection, mould number decoders and rejection means via a central evaluating means e.g. a mini computer.

An object of the present invention is thus to eliminate the aforesaid disadvantages and provide a more efficient, flexible and inexpensive system for automatic inspection of package units of e.g. glass or plastics.

The present invention intends therefore to provide an inspecting apparatus with rapidly exchangable detector units connected to particular inspection stations and which is equipped with identification means and rejector means all of which are intended for co-operation with a central evaluating means for quick analysis of reported faults and thereby enabling fast correction of the fault or faults at an early stage.

According to the invention this is achieved by a basic unit having a product advancing device working in sequential steps and using known principles as well as a mould number reading device operating in one of the steps. The basic unit may thus be given any preferred number of steps or stations each and one provided with an exchangable detector unit of such type as required by the present manufacturing demand. The detector units may be either preset or set after installation on the basic unit. The first methode will in certain cases result in great savings of time.

Therefore the basic unit is made common for all detector units and these in turn are easily interchangable with the provided inspecting apparatus, which is very flexible and easily adjustable to the prevailing demand of every production line.

It is then possible to use the same or similar basic units on other production lines to obtain the advantage that the total number of required detector units or modules of a certain type.

A further object of the present invention is that visually detected products with mould originating faults may be automatically rejected by the inspector, who initiates impulses with information regarding mould member and fault type number to the evaluating means, which then initiates rejection impulses if required to the rejector means.

The impulses from the detector units and mould number detector may be electronically combined so that one receives information on fault type as well as mould number. This information may instantaneously or later be processed and forwarded to the production personnel for information and possible corrective measures. By letting the evaluating means process the information from visual and automatic inspection alike it is also possible to obtain an over all picture of the rejection situation as well as a basis for production control and for statistics and information to those responsible for manufacture. In this process it is suggested that all the information from all inspecting stations to the evaluating means be delivered directly in binary form for automatic data processing.

The characteristics of the present invention are further illustrated by the appended claims.

Figure 2:
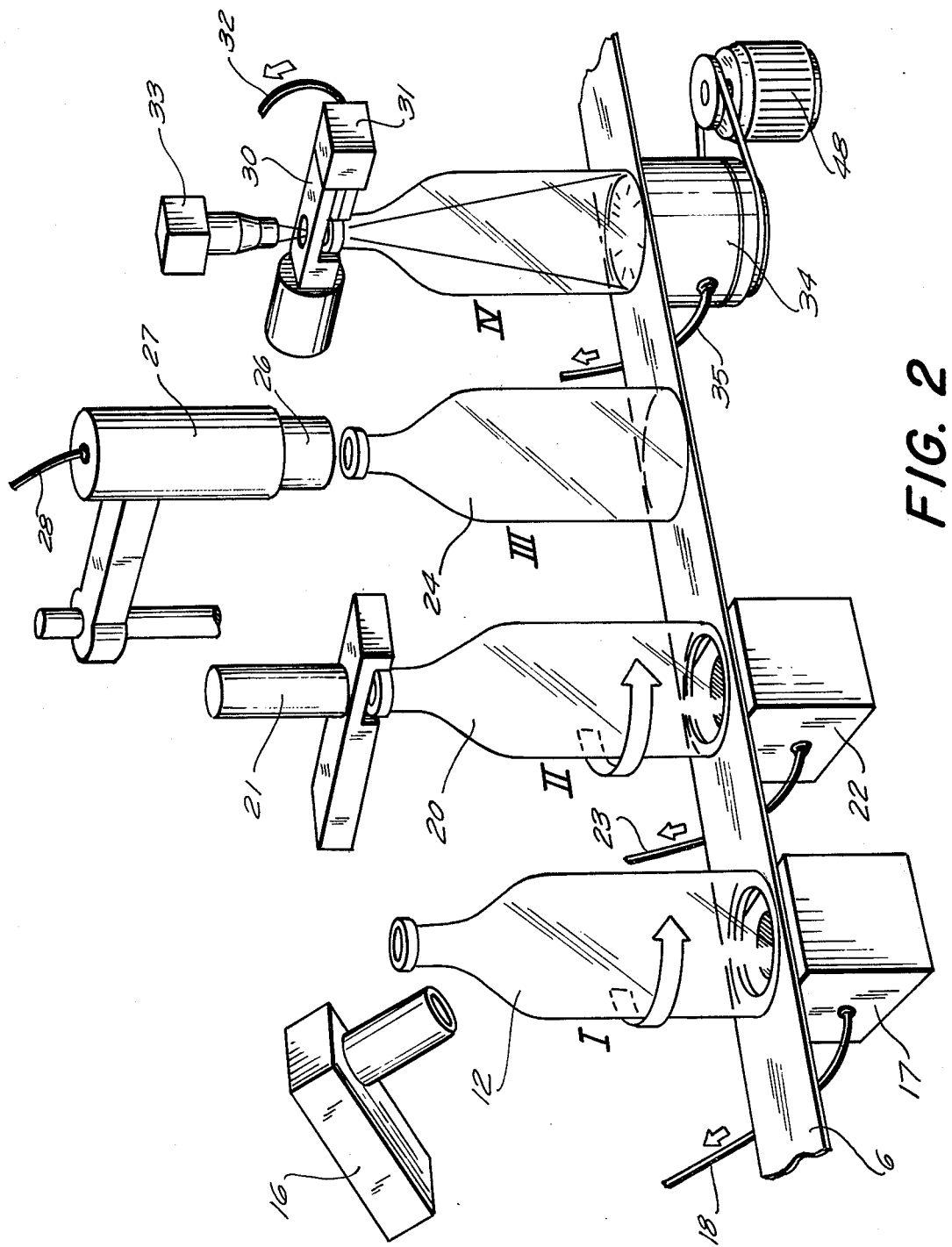
Figure 3:
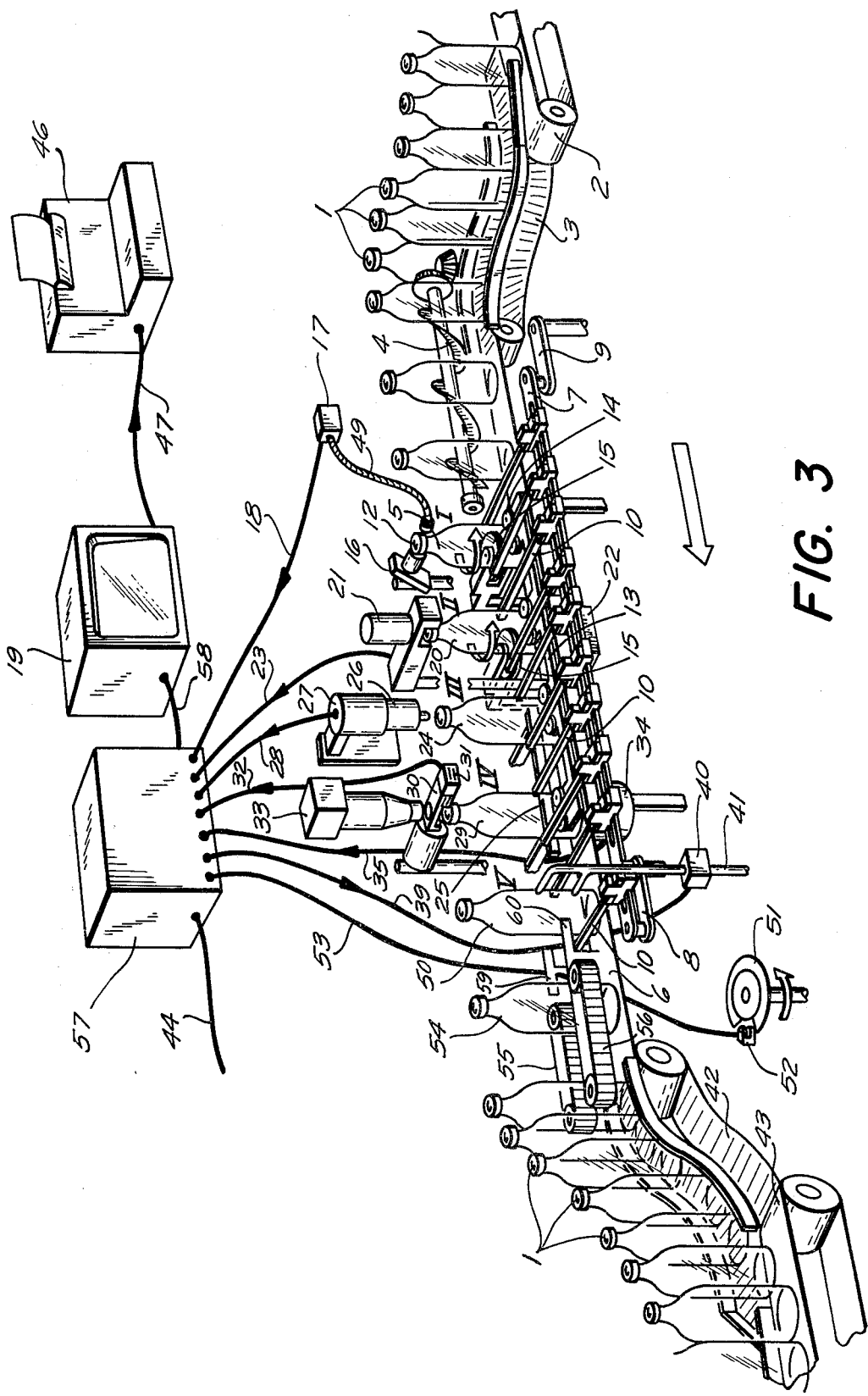

The present invention will be described in the form of certain preferred embodiments as shown in the accompanying drawings, where FIG. 1 shows in perspective an inspecting apparatus with four stations, FIG. 2 shows a schematic representation of underlaying detectors, and FIG. 3 shows an installation with fire stations.

FIG. 1 shows a moving band 2 with glassbottles 1, which are transfered to a sliding strip 6 by means of a curved, slightly S-shaped feeding band 3 and a feeding screw 4, the length of which is chosen such that a bottle 5 stops in the shown position on the slide strip 6. A fork resembling device is mounted on a fork support 7, which is hinged on two rotating arms 8, 9. Upon rotation of said arms 8, 9 the fork support 7 and advancing forks 10 mounted on same will follow a circular movement. The advancing forks 10 are by means of easily movable mounting blocks 11 fixed on the fork support 7 to facilitate adjustment to different bottle diameters. The bottle 12 has thus been moved by the advancing forks 10 from the initial position 5 to a first inspection station I. A positioning rod 13 is mounted above the slide strip 6 and is provided with two holding wheels 14 for each of station I to IV. The positioning rod 13 is movable in a transversal direction by means of a cam, which is not shown, such that the bottle 12 with the aid of the wheels 14 are pressed forward and thus against a rear and continuously rotating friction wheel 15 such that the bottle 12 is rotated. The first inspection station I is further equipped with a light emitting device 16 consisting of a lamp with lens system to illuminate the rotating bottle 12 from a certain direction. Besides, the first station I is provided with a light sensitive detector 17 underlaying the slide strip 6, as shown in FIG. 2. The detector 17, which via a wire 18 is connected with an evaluating means 19 e.g. a mini computer, may also be located in front of the bottle 12 and above the slide strip 6. At the next angular movement of the fork devise the bottle 12 will be transported to a second position 20 at a second station II. At this station as well there are two corresponding holding wheels 14 which press the bottle 20 towards a friction wheel 15 such that the bottle 20 is made to rotate. The second station II is also provided with a lightemitting means 21 illuminating the bottle 20 from a suitable angle in view of which a suitably located light sensitive detector 22 is provided as shown in FIG. 2. The detector 22 is connected with the minicomputer 19 via a wire 23.

After the succeeding annular movement of the fork device the bottle will be transported to new location 24 constituting a third station III where two holding wheels 14 press the bottle 24 against a rearmounted support bracket 25. The third station III is here provided with a hole gauge 26, which is inserted down into and around the neck of the bottle 24. The hole gauge 26 is thus provided with a built in, automatic detector means 27, which measures both inner- and outer diameter and supplies a signal should any of the hole diameters exceed or fail below accepted maximum or minimum values of the computer 19 via line 28.

During the following annular fork movement the bottle 24 is moved to a new position 29 being a fourth station IV, where two holding wheels 14 press the bottle 28 against the support bracket 25. The fourth station IV comprises a height gauging device 30, which is in optical manner registers whether the height of the bottle 29 is within given tolerances. The detector 31 transmits in the process, via conduit 32, a signal to the computer should height of the bottle be outside the range.

Further there is mounted on the fourth station IV a mould number reading device 34, whose upper part 33 comprises a lamp with lens system as shown in FIG. 1. The number reader proper 34 is however located underneath the slide strip 6 and is shown in FIG. 2 and driven by motor 48. Via signal wires 35 the number reader 34 can now report information to the computer 19.

After the fourth station IV the bottle 29 is moved ahead to the next position shown by bottle 36. In this position, where the bottle 36 is brought into contact with an exit screw 37, there is arranged an ejector means 38 provided with two nozzles for possible blowing away of the bottle 36 upon orders from the computer, which via the order line 39 governs a compressed air valve 40, which is connected to a compressed air supply conduit 41. At the end of the exit screw 37 the slide plate 6 is terminated at a slightly S-shaped outgoing band 42 taking over the bottles for connection to the outgoing manufacturing line band 43.

The evaluation means or computer 19 is shown in FIG. 1 with incoming line 44, which may introduce information to the computer 19 from other not shown inspecting stations along the manufacturing line. The computer 19 may also be equipped with a display e.g. a monotor screen 45 for visual indication according to a certain program as to how registered faults have appeared. The computer 19 may also be provided with typing means 46, which via a line 47 receives impulses for direct printing of registered faults.

The above described installation now functions in the following manner with reference to FIG. 1: A manufacturing line 2 feeds incoming bottles 1 on to a transfer band 3 in the front end of which a feeding screw 4 takes over to advance the bottles evenly spaced from one another. Adjusted to this distance and the diameter of the bottles there is a rotating fork resembling device 7–11, which moves circularly in parallel with the slide strip 6 upon which the bottles stand. The forks 10 will then advance the bottles 5,12,20,24 and 29 one step at the time, which step corresponds to the distance between each bottle when they are delivered from the screw 4. Due to the circular movement or if one so prefers reciprocating movement in the transverse and longitudinal direction every bottle will be accelerated by the forks 10 from stand still at one station in order to be in the opposite manner retarded at the approach of the succeeding station back down to stand still. During the time (0.1 to 0.02 s), that the bottles then stand still while the forks move out the picture and back again leftward to advance the next row of bottles, the desired inspection must take place. Because of the short time available it is necessary to swiftly orient the bottle to the position or movement needed for the inspection proper. This step has been standardized for all the inspections stations I—IV, where a cam operated positioning rod equipped with two holding wheels 14 per station for contact with the bottles will press the same into the plane of the picture transverse to the transport direction of the bottles.

At the first and second station I and II, which are normally intended for detection, the bottles are brought into quick contact with a rapidly rotating friction wheel of e.g. rubber, such that the bottle immediately starts to rotate rapidly. So rapidly that at least a full turn will be completed in the fraction of a second that the bottles are locked by the positioning rod 13 and therefore in rotation. During this time the bottles are illuminated from preferred directions and at preferred places by a lamp system 16, 21 for station I and II respectively and possible lightpulses are registered by detectors 17 and 22 resp. at the rear of or underneath the line. The light pulses may originate from cracks in the glass. These detected signals are then forwarded to a computer for evaluation via the lines 18 and 28. After having completed at least one full revolution, the bottles are released by the positioning rod 13 which discontinues its pressure when the co-operating, not shown cam is reverted to the low level. This happens just before the forks 10 on their way into and towards the picture start their movement to the right in order to accelerate a new row of bottles.

When the bottle 20 is thus transported to the third station III and to a position 24 the positioning rod 13 will press it against the rear support bracket 25 to firmly lock it in place while a hole gauge assembly 26 rapidly decends and by means of two concentrical hole gauges simultaneously gauges both the inner- and outer diameter of the neck of bottle 24. A signal device 27 is arranged on top of hole gauge 26 and is designed in such a way that both maximum and minimum faults on both the outer- and innerdiameters may be individually indicated and forwarded via line 28 to the computer 19.

The bottle 24 is then transported to the fourth station IV and to a fourth location 29, where it again is held in position by the positioning rod 13 and where a lamp with lenses 30 for parallel beams are illuminating the upper part of bottleneck. A detector 31 in the form of two slots with rear light sensitive detectors will now register whether the highest part of the bottle is within acceptable tolerances. If this is not the case the detector will deliver a signal for indicating whether the bottle exceeded the maximum height or is below minimum height.

The fourth station IV is further equipped with an identification device or so called mould number reader, the lamp and lens system 33 of which sends a converging and circular beam concentrically and along the axis of the bottle 29 and the neck of same. The lens system is now so adjusted that the beam focuses at a calculated distance down the bottle neck and is then diverging again such that the whole bottom of the bottle 29 in this way will be lit. The bottom of the bottle 29 will thus be rather uniformly illuminated and if lenses e.g. in the shape of cylindrical projections or recessions where moulded into the bottom of the bottle. These lenses would concentrate or disperse the light that is penetrating the bottom of the bottle. In order to detect those light deflections under the bottle, a hole has been cut through the slide plate 6 under the bottle 29 and below this hole a rotably arranged and light sensitive detector 34 has been located. The lenses in the bottom of the bottle 29 have all been placed along a certain circle concentric with the axis of the bottle and along which peripheral circle the detecting lens of the detector 34 is movable. The detector may here be rotated by means of a fast motor, such that there is time to read at least two full turns during the short while the botte 29 is at a stand still. The lenses at the bottom of the bottle are in this process set according to a particular binary code system, which is provided with possibility for selfcorrection. Besides, a certain lens combination is used to start the decoding. Detected characters and corresponding pulses are then fed via line 35 to the computer 19. In the same line 35 continuous pulses are also fed from a pulse generator (not shown) located in the mould number decoder such that the computer at every moment knows the angular position of the mould number decoder 34 during the decoding turns after the instant that the decoding has been started up by the start combination. This makes the decoder insensitive for the angular starting position of the bottle 29, which position with the above described feeding device is quite arbitrary. After a complete mould number decoding the computer 19 is provided with information regarding the origin of the bottle and may pin point those faults, which possibly show up in a certain bottle, to the origin of the fault.

After the fourth station IV the bottle 29 is advanced into contact with the exit screw 37. The computer 19 has now a possibility to reject a certain faulty bottle by ordering the compressed air valve 40 to blow the faulty bottle off the slide strip 6. The screw then feeds approved bottles along to the curved outgoing band 42, which retrack the bottles back to the line 43. All detectors 17, 22, 27, 31 and 34 in the system are designed such that they delivery their information or signals directly in pulse- or binary form, so that when using the information a mini-computer 19 may use the signals directly. This should also be the case with the information or those order signals which enter from outside inspection stations via the line 44. The computer 19 may suitably be provided with a display means, e.g. a picture screen for visual information to concerned personnel.

According to another embodiment of the present invention as shown in FIG. 3, having a moving band 2 with bottles 1 is designed in the same manner as the inspection installation of FIG. 1. This installation, however, has been expanded with a fifth station V, to which a bottle 50 is brought by the feeding means 10. At the station V the rejection means 40 has been positioned in the form of a compressed air valve with associated nozzles and a wire 41. Further the bottle exit means have been exemplified by a support plate 59 possibly provided with a not shown arresting spring and two roller bands 55 and 56 for the transport of bottle 54 to the outgoing bands 42 and 43.

As a means of controlling the inspection operation a position disc 51 is also shown in FIG. 3 with a contact means 57 which in turn may be connected via wire 53 to an evaluation means 57 which in turn may be connected to a mini-computer-with-display 19 via wire 58. The detector 17 of the first check inspection station I is here located in an arbitrary position along the outside of the envelope surface of the bottle 5 and connected via an optical cable 49.

The installation shown in FIG. 3 functions in the same manner as the installation according to FIG. 1 with the difference that the outgoing bottles are not controlled by a screw but removed by means of two driven bands 55, 56. Further all inspection operations take place during a certain time interval, which is governed by the position disc 51 and its interrupted peripheral flange. All inspection operations are registered and evaluated by a central unit 57, which if requested may be co-operating with a mini-computer 19 with display unit and possibly a typewriter 46. If a comprehensive documentation of the entire quality control with resulting rejection rate is required, a typewriter may e.g. be connected to the computer.

Should documentation of the total quality control and associated rejection rate be required a typewriter may be connected to the computer. One should note that a computer is not necessary for the use of the installation but one may of course connect the detectors to some simpler type of connecting means directly to the rejector means for direct rejection without previous evaluation.

It is further obvious that above described embodiment, preferred combinations and number of stations may be varied within wide limits without departing from the scope of invention. This should be particularly evident considering that every station has a system for easy and fast exchange of inspecting units, in such a way that type of fault, tolerances etc. with a few simple movements may be changed. Thus it becomes possible to use preadjusted units such that the exchange proceedure takes a minimum of time.

Even if the present invention is described with a limited number of examples only, it must be assumed that other embodiments and combinations as well may fall within the scope of the present invention.

I claim:

1. Apparatus for inspecting moulded containers from a plurality of moulds wherein each mould moulds in the container an identification unique to the mould comprising a first inspection station including means for reading the moulded identifications of the container and transmitting identification signals related to the read identifications, a second inspection station including means for detecting particular flaws in the moulded containers and for transmitting flaw indicating signals, means for guiding moulded containers serially through the inspection stations, and registering means receiving the flaw indicating signals and the identification signals for registering which of the moulds is producing faulty containers.

2. The apparatus of claim 1 further comprising further inspection stations for inspecting for a plurality of flaws in the moulded containers.

3. The apparatus of claim 2 wherein one of said further inspection stations includes means for detecting flaws related to the mouth of the moulded containers.

4. The apparatus of claim 2 wherein one of said further inspection stations includes means for detecting flaws related to the height of the moulded containers.

5. The apparatus of claim 1 further comprising means responsive to said registering means for ejecting moulded containers with flaws.

6. The apparatus of claim 1 further comprising means for transmitting flaw indicating signals and identification signals from a visual inspection station to said registering means, said registering means being provided with means for accumulating a count of the flaw indicating signals and means for generating rejection signals in response to the receipt of the flaw indicating signal for generating rejecting pulses, and container rejection means for rejecting a container in response to each received rejecting pulse.

* * * * *